United States Patent
Mayer et al.

(10) Patent No.: US 11,288,404 B2
(45) Date of Patent: Mar. 29, 2022

(54) RESOURCE PROTECTION

(71) Applicant: Infineon Technologies AG, Neubiberg (DE)

(72) Inventors: Albrecht Mayer, Deisenhofen (DE); Glenn Ashley Farrall, Long Ashton (GB); Frank Hellwig, Wunstorf (DE)

(73) Assignee: Infineon Technologies AG, Neubiberg (DE)

( * ) Notice: Subject to any disclaimer, the term of this patent is extended or adjusted under 35 U.S.C. 154(b) by 250 days.

(21) Appl. No.: 16/441,227

(22) Filed: Jun. 14, 2019

(65) Prior Publication Data
US 2020/0394339 A1 Dec. 17, 2020

(51) Int. Cl.
*G06F 21/74* (2013.01)

(52) U.S. Cl.
CPC ...... *G06F 21/74* (2013.01); *G06F 2221/2149* (2013.01)

(58) Field of Classification Search
CPC ................. G06F 21/70–76; G06F 2221/2149
See application file for complete search history.

(56) References Cited

U.S. PATENT DOCUMENTS

| | | | | |
|---|---|---|---|---|
| 7,444,668 | B2 * | 10/2008 | Moyer | G06F 21/316 |
| | | | | 710/110 |
| 9,076,001 | B1 * | 7/2015 | Jagmag | G06F 21/74 |
| 2009/0037631 | A1 * | 2/2009 | Owens | G06F 21/74 |
| | | | | 710/266 |
| 2015/0269396 | A1 * | 9/2015 | Grafton | G06F 21/74 |
| | | | | 726/2 |

\* cited by examiner

*Primary Examiner* — Madhuri R Herzog
(74) *Attorney, Agent, or Firm* — Schiff Hardin LLP

(57) ABSTRACT

A System on Chip (SoC), including a plurality of processor cores including a secure master, which is configured to run security software, and a non-secure master, which is configured to run non-security software; a resource configured to be shared by the secure master and the non-secure master; and a state machine configured to protect the resource by allowing only the secure master to transition the resource to a particular state of the state machine, and allowing only the non-secure master to transition the resource to another particular state of the state machine.

14 Claims, 6 Drawing Sheets

---

500A Resource Protection Method

510A
Assigning a processor core of a plurality of processor cores to be a secure master, which is configured to run security software.

520A
Assigning another processor core of the plurality of processor cores to be a safe master, which is configured to run safe software.

530A
A state machine protecting a resource, which is configured to be shared by the secure master and the safe master, by allowing only the secure master to transition the resource to a particular state of the state machine, and allowing only the safe master to transition the resource to another particular state of the state machine.

200
State Machine Diagram

M = safe (non-secure) master (110-0)
CSM (Cyber Security Master) = secure master (110-cs)
c2r = configure to run
csprot = cyber security protection signal

Figure 4A

400A
Bit Fields of Resource Protection Register 170

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|
| M_P | MEN | | | TAG_ID | | | | PRSE | | PRS | | VME | | VM | |
| w | rw | | | rw | | | | rw | | rw | | rw | | rw | |

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
| R3_P | R3 | | | R2_P | R2 | | | R1_P | R1 | | | R0_P | | R0 | |
| w | rw | | | w | rw | | | w | rw | | | w | | rw | |

Figure 4B

400B
Table 4B – Bit Field Definitions of Resource Protection Register 170 of Figure 4A

| Field | Bits | Type<br>r: read<br>w: write | Description |
|---|---|---|---|
| Rx<br>(x-0-3) | 4*x+2 :4*x | rw | Resource protection x with states<br>0 Init<br>1 Run<br>2 Config<br>3 reserved (writing this value has no effect)<br>4 RunLock<br>5 RunSec<br>6 ConfigSec<br>7 CheckSec |
| Rx_P (x=0-3) | 4*x+3 | w | Rx Write Protection<br>Protect Rx against unintended changes.<br>0 Rx is not changed<br>1 Rx is updated by this write access |
| VM | 18:16 | rw | Virtual Machine definition for master M<br>Restricts M to VM for transactions with VM_VALID=1 |
| VME | 19 | rw | Virtual Machine definition Enable for master M<br>0 VM is ignored<br>1 VM is part of master M definition |
| PRS | 22:20 | rw | Protection Set definition for master M<br>Restricts M to PRS for transactions with PRS_VALID=1 |
| PRSE | 23 | rw | Protection Set definition Enable for master M<br>0 PRS is ignored<br>1 PRS is part of master M definition |
| TAG_ID | 29:24 | rw | TAG ID definition for master M<br>Sets M to the master with this TAG ID |
| MEN | 30 | rw | Enable for master M definition<br>0 All masters can act a M (VM, PRS and TAG_ID are ignored)<br>1 VM, PRS and TAG_ID define the master M |
| M_P | 31 | w | Write Protection for VM, PRS, MI and MEN<br>Protect the master M definition against unintended changes.<br>0 VM, PRS, TAG_ID and MEN are not changed<br>1 VM, PRS, TAG_ID and MEN are updated by this write access |

Figure 5A

510A
Assigning a processor core of a plurality of processor cores to be a secure master, which is configured to run security software.

↓

520A
Assigning another processor core of the plurality of processor cores to be a safe master, which is configured to run safe software.

↓

530A
A state machine protecting a resource, which is configured to be shared by the secure master and the safe master, by allowing only the secure master to transition the resource to a particular state of the state machine, and allowing only the safe master to transition the resource to another particular state of the state machine.

500A
Resource Protection Method

Figure 5B

510B
Assigning a virtual machine of a plurality of virtual machines of a master of a processor core of a plurality of processor cores, to be a secure virtual machine, which is configured to run security software.

↓

520B
Assigning another virtual machine of the plurality of virtual machines to be a safe virtual machine, which is configured to run safe software.

↓

530B
A state machine protecting a resource, which is configured to be shared by the secure virtual machine and the safe virtual machine, by allowing only the secure virtual machine to transition the resource to a particular state of the state machine, and allowing only the safe virtual machine to transition the resource to another particular state of the state machine.

500B
Resource Protection Method using VMs

RESOURCE PROTECTION

BACKGROUND

A System-on-Chip (SoC) includes resources accessible by processor cores. The SoC may be a microcontroller. The processor cores may be Central Processing Units (CPU). The resources may include memory, configurable address ranges within a memory, peripherals, or peripheral subfunctions (e.g., clock control system). In order for the SoC to be safe and secure, access and control of its resources must be safe and secure.

Different hardware and software may have different safety and security properties and risks. Secure software, running on secure and protected hardware, is usually secure but not safe. Safe software, running on safe hardware (e.g., lockstep CPU), is safe but could be malicious. All other software could be malicious if the SoC is compromised. Protection of SoC resources should be safe and secure considering the safe, secure, and malicious properties of software running on the SoC.

BRIEF DESCRIPTION OF THE DRAWINGS

FIG. 4A illustrates bit field of a resource protection register in accordance with aspects of the disclosure.

FIG. 4B illustrates a table of bit field definitions of the resource protection register of FIG. 4A in accordance with aspects of the disclosure.

FIG. 5A illustrates a flowchart of a resource protection method in accordance with aspects of the disclosure.

FIG. 5B illustrates a flowchart of another resource protection method in accordance with aspects of the disclosure.

DETAILED DESCRIPTION

The present disclosure is directed to safe and secure protection of resources on a System on Chip (SoC).

The resource protection comprises, for example, two levels of protection. A first level defines which bus master (safe or secure bus master) is allowed to change a configuration of a resource protection. A second level is protection is for the resource itself by controlling interactions between the safe and the secure bus masters. There may be one or more additional levels of protection that are not a subject of this disclosure.

The protection mechanism is controlled by a state machine where certain state transitions can only be done by a safe bus master and other transitions by a secure bus master. The state machine ensures that each of the protected resources is in a safe and secure state during configuration, and the resource can no longer be changed while a secure bus master checks the configuration. Throughout this description a bus master is generally more simply referred to as a master.

Figure 1:
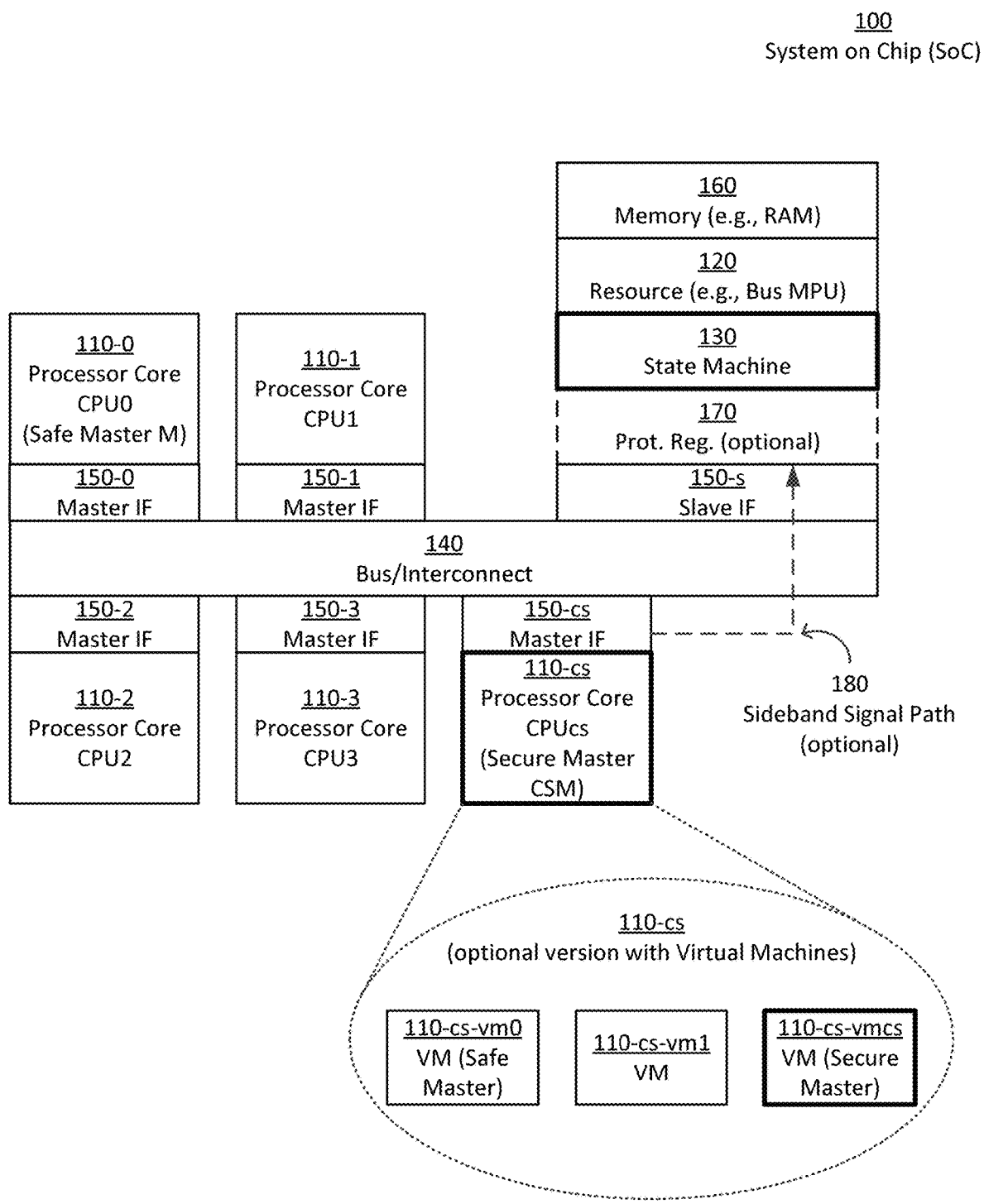
FIG. 1 illustrates a System on Chip (SoC) in accordance with aspects of the disclosure.

FIG. 1 illustrates a SoC 100 in accordance with aspects of the disclosure.

A SoC is an integrated circuit that integrates all components of a computer or other electronic system. These components typically, but not always, include a Central Processing Unit (CPU), memory, input/output ports, and secondary storage, all on a single substrate or chip. The SoC may comprise digital, analog, mixed-signal, and often radio frequency signal processing functions, depending on the application.

The SoC 100 comprises a plurality of processor cores 110, a resource 120, a state machine 130, a bus/interconnect 140, a plurality of interfaces 150, a global memory 160, an optional protection register 170, and an optional sideband signal path 180.

The plurality of processor cores 110 in this example are CPUs, and include processor core 110-0 (CPU0), processor core 110-1 (CPU1), processor core 110-2 (CPU2), processor core 110-3 (CPU3), and processor core 110-cs (CPUcs). A processor core 110 could alternatively be a baseband processor for a mobile phone. Each of the plurality of processor cores 110 is coupled to the bus 140 by a respective master interface 150 (150-0, 150-1, 150-2, 150-3, and 150-cs). The memory 160, resource 120, state machine 130, and optional protection register 170 are coupled to the bus 140 via a slave interface 150-2.

The processor core 110-cs is assigned as a secure master, which is configured to run security software. Throughout the disclosure, "cs" means cyber security. The secure master 110-cs may be, for example, a Hardware Security Module (HSM). The processor core 110-0, in this example, is assigned as a non-secure master, which is configured to run non-security software. This non-secure master 110-0 may be assigned as a safe master configured to execute safety software. Throughout this description the non-secure master 110-0 will be described as a safe master, but it is understood that the disclosure is not necessarily limited in this respect.

The resource 120 is configured to be shared by the secure master 110-cs and the non-secure master 110-0. The shared resource 120 may be a register, a memory, a state, an input signal, an output signal, etc. Alternatively, the resource 120 may be a clocking system, which should be properly configured from a safety perspective and also from a security perspective.

The resource 120, in this example, is a bus Memory Protection Unit (MPU). The bus MPU includes a set of registers configured to control access to the memory 160, such as by limiting write access to certain ranges of the memory 160. The memory 160 may be, for example, a Random Access memory (RAM), but the disclosure is not limited in this respect.

The state machine 130 is configured to protect the resource 120 by allowing only the secure master 110-cs to transition the resource 120 to a particular state of the state machine 130, and allowing only the safe master 110-0 to transition the resource 120 to another particular state of the state machine 130. This will be described in more detail further below.

The secure master 110-cs or the safe master 110-0 may be configured to identify itself to the resource 120 as the respective secure master or safe master by a master identification, which is part of the bus transaction and comparable to a configurable or hard-coded reference master identification stored at the resource 120. The optional protection register 170 is configured to store this configurable or hard-coded reference master identification, which may be write protected. The resource 120 does not need local knowledge as to which master is the secure master 110-cs; preventing tracing of secure master activities is thereby simplified. The protection register 170 may be read by any master at any time. A write to the protection register 170 by a master other than the safe master 110-0 or the secure master 110-cs may trigger an alarm. Also, an attempted write to the protection register 170 of the safe master 110-0 or the secure master 110-cs representing a state machine transition that is not valid may be silently ignored. It is appreciated that the safe master 110-0 may also be defined using a second protection register.

Alternative to the bus 140 route, the secure master 110-cs may be configured to transmit its identification as the secure master 110-cs to the resource protection register 170 via a sideband signal over a sideband signal path 180 as part of the bus transaction. Since the sideband signal is hardcoded, there is certainty this signal is from the secure master 110-cs. The protection register 170 permits definition of a secure master 110-cs and/or a safe master 110-0, and may have control bits for up to four state machines 130.

The secure master 110-cs in the illustrated example is defined by the sideband signal by being part of a bus transaction. Alternatively, the secure master 110-cs could be defined in a manner similar to the safety master 110-0 with a second protection register 170.

Only the secure master 110-cs or the safe master 110-0 identifiable by a master identification matching the reference master identification is permitted to change the reference master identification to identify another one of the plurality of processor cores 110 as the secure master or the safe master, respectively.

The secure master 110-cs may optionally comprise a plurality of virtual machines 110-cs-vm. These virtual machines 110-cs-vm may include a virtual machine assigned to be a secure master 110-cs-vmcs, which is configured to execute security software, and optionally a safe virtual machine 110-cs-vm0, which is configured to run safe software. The safe virtual machine 110-cs-vm0 may be may be assigned as a safe master configured to execute safe software.

The secure master and/or safe master being a virtual machine is similar to being the processor core, as discussed above. The resource 120 may be configured to be shared by the secure virtual machine 110-cs-vmcs and the safe virtual machine 110-cs-vm0. The state machine 130 may be configured to protect the resource 120 by allowing only the secure virtual machine 110-cs-vmcs to transition the resource 120 to a particular state of the state machine 120, and allowing only the safe virtual machine 110-cs-vm0 to transition the resource 120 to another particular state of the state machine 130. The secure virtual machine is identifiable by a secure virtual machine identification, which is part of a bus transaction and comparable to a configurable or hard-coded reference identification stored at the resource 120, such as in the protection register 170.

The SoC may comprise a plurality of resources 120 (not shown) and a plurality of state machines 130 (not shown). Each of the resources 120 may have its own state machine 130.

Figure 2:
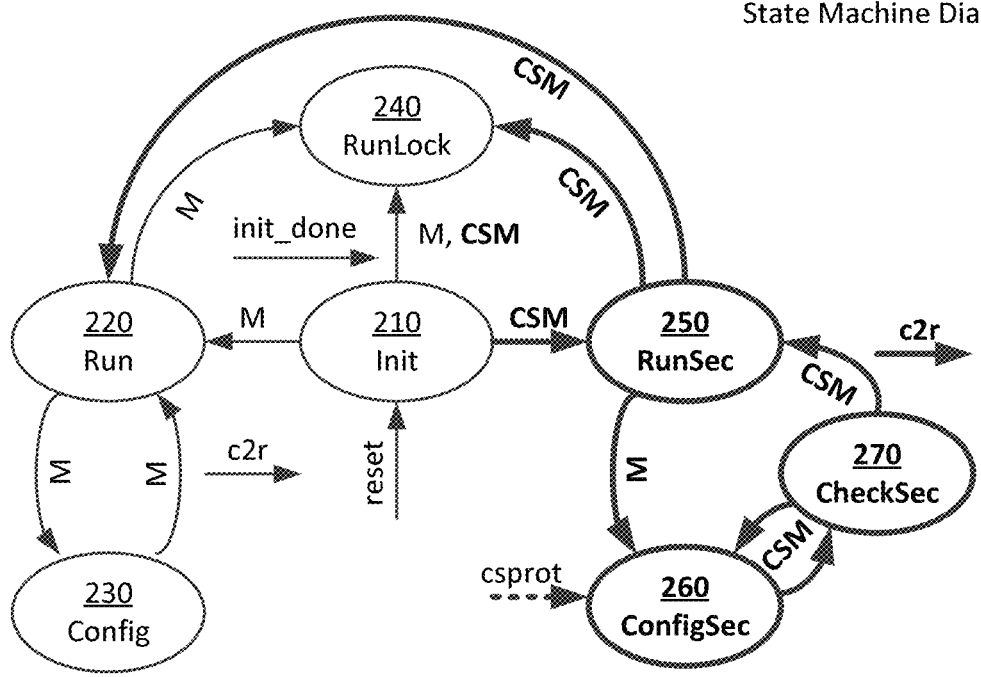
FIG. 2 illustrates a state machine diagram in accordance with aspects of the disclosure.

FIG. 2 illustrates a state machine diagram 200 in accordance with aspects of the disclosure.

The state machine diagram 200 is of the state machine 130 of FIG. 1. The state machine diagram 200 illustrates resource protection of a particular resource 120. In this example, the state machine diagram 200 has seven states—initialization state 210, run state 220, configuration state 230, run lock state 240, secure run state 250, secure configuration state 260, and secure check state 270.

The basic operation of the state machine 130 is that all configurations are performed by the safe master M (110-0). This applies not only to the resource 120 itself, but also for control of a protection mechanism of the resource 120. The only exception are purely secure resources, where all operations can be handled by the secure master CSM (Cyber Security Master; 110-cs) once it is ensured that the secure master CSM (110-cs) cannot unintentionally impact safe resources.

Critical operations, such as configurations, can only be performed in specific states, which are other than a normal operation state. These critical states can only be reached by transitions which can be performed by an authorized master only, such as the secure master CSM (110-cs) or the safe master M (110-0). Each of the state transitions can be performed by only a single master, which is either the safe master M or the secure master CSM. The only exception is the transition from initialization state 210 to the run lock state 240, which may be performed by either the secure master CSM (110-cs) or the safe master M (110-0).

A fundamental concept for a shared, safe, and secure resource 120 is that the configuration is performed by the safe master M (110-0) and then checked by the secure master CSM (110-cs) before the resource 120 becomes active. This concept is reflected by the right-hand side of the state machine diagram 200, which has the secure run state 250, the secure configuration state 260, and the secure check state 270.

Basically, the safe master M (110-0) cannot trust the secure master CSM (110-cs) from a safety perspective, and the secure master CSM (110-cs) cannot trust the safe master M (110-0) from a security perspective. Thus for a shared resource 120, a reconfiguration is performed by the safe master M (110-0), and the secure master CSM (110-cs) supervises.

More detailed explanations of states and transitions of the state machine 130, with reference to the state machine diagram 200 of FIG. 2, follow.

The states and transitions of the state machine 130 allow operation and configuration of the resource 120 in a safe and secure manner. After reset, all resources 120 are in the initialization state 210 where they are configurable without any restriction. This initialization state 210 is used only in the initial startup phase under the assumption that only trusted safe and secure software is running.

A purely safe resource may not be configured by the unsafe secure master CSM (110-cs). The shared resource 120 is configured by the safe master M (110-0) because the result is a simpler system design. The SoC 100 operating normally may be handled with any approach. However, two critical cases are when the secure master CSM (110-cs) is behaving in an unsafe manner, and when the safe master is malicious. Both cases are addressed by the right-hand side of the state machine diagram 220A having the secure run state 250, the secure configuration state 260, and the secure check state 270.

Initialization State 210:

The initialization state 210 occurs after a reset. For the resource 120, this state is similar to the configuration state 230. The difference between the initialization state 210 and the configuration state 230 is that in the initialization state 210, a state transition to the secure run state 250 or the run lock state 240 is still possible.

Run Lock State 240:

The run lock state 240 is a safe and secure locked state of all resources 120. An application configures all resources 120 to be used, and then triggers an initialization done signal "init_done" signal. The init_done signal transitions all resources 120 that are still in the initialization state 210 into the run lock state 240 using a central mechanism. This is a convenient way to force all resources 120, including those that will not be needed, into a safe and secure run lock state 240. Resource configurations can then not be changed before a next reset.

Run State 220 and Configuration State 230:

The run state 220 is the normal operation state of the resource 120. A typical approach is that in the initial startup phase in the initialization state 210, only the safe master M (110-0) is set, and this specific safe master M (110-0) controls the resource configuration later during the configuration state 230. The change from the run state 220 to the configuration state 230 mainly satisfies a safety aspect that critical resources may not be changed with a single, unintended write by software. By using the state machine 130, an additional precondition is that the safe master M (110-0) locally controls the transition of the resource 120 from the run state 220 to the configuration state 230 because only an individual resource 120 is affected, there is no need for a general timeout mechanism as in a global control of the resource states.

Secure Run State 250, Secure Configuration State 260, and Secure Check State 270:

During these states, the safe master M (110-0) interacts with the secure master CSM (110-cs) because the resources 120 are shared between safety and security. This is shown in the right-hand side of FIG. 2, which is similar to the left-hand side. More specifically, the secure run state 250 and secure configuration state 260 are similar to the run state 220 and configuration state 230, respectively. The differences are an additional secure check state 270, and some of the transitions on the right-hand side are controlled by a different master, that is, the security master CSM (110-cs) rather than the safe master M (110-0). Safety-critical transitions are controlled by the safe master M (110-0), and security-critical transitions are controlled by the secure master CSM (110-cs).

In these states the secure master CSM (110-cs) may be defined by a sideband signal or there are two protection registers, one to define the safety master M (110-0), and the other to define the secure master CSM (110-cs).

Secure Run State 250 to Secure Configuration State 260:

The state machine 200 is configured to allow only the safe master M (110-0) to transition the resource 120 from the secure run state 250 to the secure configuration state 260 because the configuration is safety-relevant. This is accomplished by the safe master M (110-0) storing the run configuration state bits in the protection register 170.

The secure configuration state 260 is a secure and safe state. If the safe master M (110-0) is malicious, no safety can be guaranteed anyway. During the secure configuration state 260 only the safe master M (110-0) is allowed to reconfigure the resource 120. The new configuration will not be immediately effective because the assumption is that this resource 120 is critical. A critical resource is, for example, the clock system. The secure master CSM (110-cs) has an opportunity to check the new configuration during the secure check state 270 discussed below.

The secure configuration state 260 comprises writing new configuration data to shadow registers (not shown), to prevent an impermissible configuration from becoming active before being checked by the secure master CSM (110-cs).

Secure Configuration State 260 to Secure Check State 270:

The state machine 200 is configured to allow only the secure master CSM (110-cs) to transition the resource 120 from a secure configuration state 260 to a secure check state 270. During the secure check state 270, the new configuration can no longer be changed, but might not yet be active. This permits the secure master CSM (110-cs) to check the new configuration before the new configuration is made active by the transition from the secure check state 270 to the secure run state 250. This checking is using done by the secure master CSM (110-cs), but may alternatively be performed by the safe master 110-0 or another master 110.

The secure configuration state 260 and the secure check state 270 guarantee that any possible malicious configuration of the resource 120 will not impact the ability of a secure master CSM (110-cs) to detect an attack and react.

Secure Check State 270 to Secure Run State:

The state machine 200 is configured to allow only the secure master CSM (110-cs) to transition the resource 120 from the secure check state 270 to the secure run state 250, during which the resource 120 operates normally in a secure manner with the checked configuration.

This transition 120 from the secure check state 270 to the secure run state 250 activates the configure to run "c2r" transition signal, which triggers a parallel transfer from the shadow registers to the actual control registers. The c2r transition signal is active for one clock cycle during the transition from the configuration state 230 to the run state 220 or from the security check state 270 to the secure run state 250. The shadow registers may not be a single register, but instead multiple registers which preferably cannot be written individually. If the registers could be written individually, there would be a period of time when a portion of the registers have the old configuration and another portion has a new configuration.

An optional cyber security protection signal ("csprot") is a centrally controlled signal that forces a resource 120 with strong security requirements into a safe and secure state. Such a resource 120 may be, for example, a bus MPU as mentioned above. When hardware detects an attack, such as a clock glitch or a voltage attack, the hardware (e.g., an event management unit) generates the cyber security protection signal to transition the resource 120 directly into the secure configuration state 260.

Figure 3:
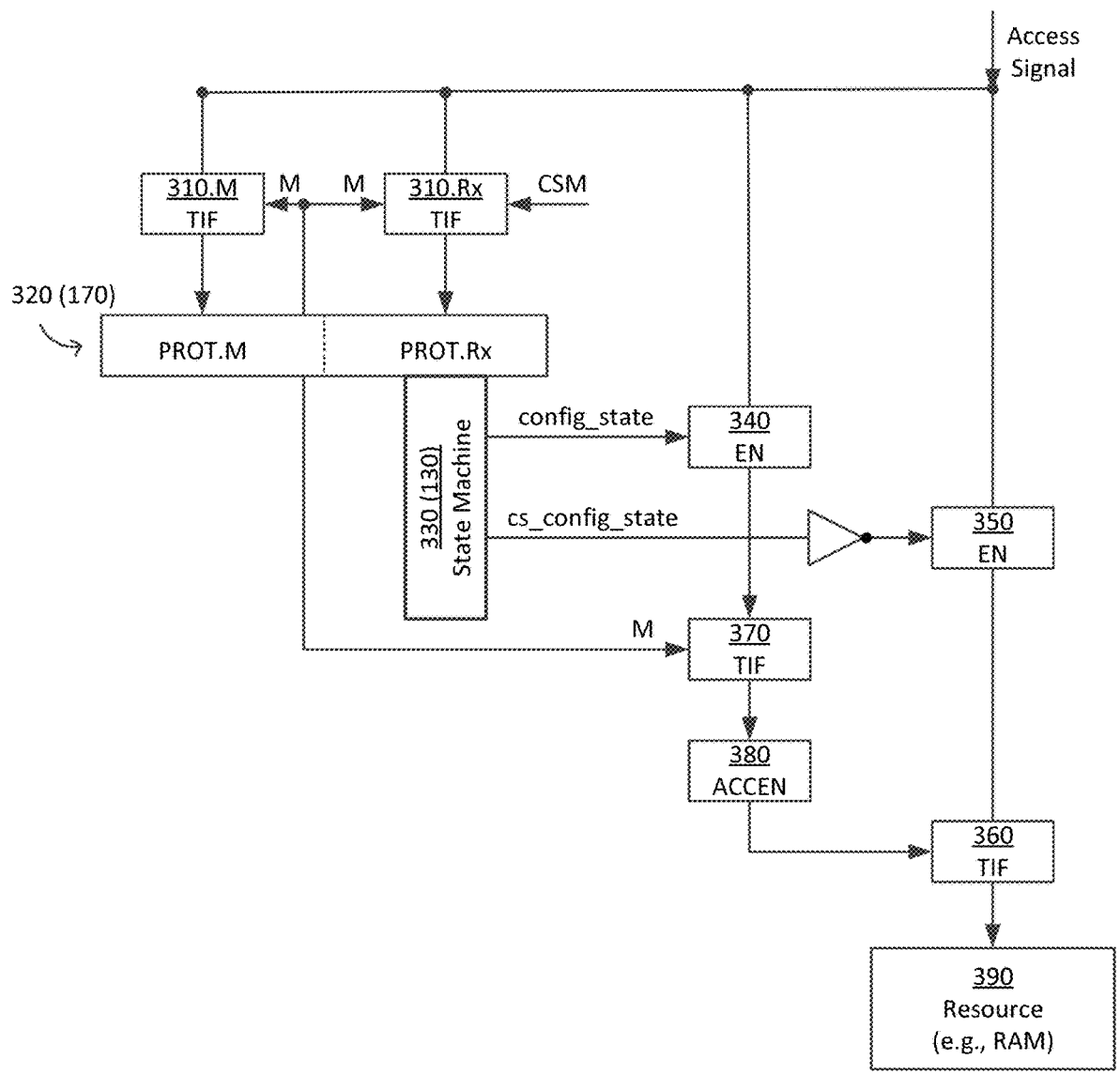
FIG. 3 illustrates a hardware implementation of a state machine in accordance with aspects of the disclosure.

FIG. 3 illustrates a hardware implementation of a state machine 300 in accordance with aspects of the disclosure.

The hardware implementation of the state machine 300 comprises Tag Identification Filter (TIF) 310.M, TIF 310.Rx, protection register 320, state machine state 330, an inverter, write enable gate 340, write enable gate 350, TIF 360, TIF 370, access enable register 380, and resource 390.

The TIF 310.M filters from an access enable signal an identification of the secure master CSM (110-cs) that can reconfigure a resource 120. The TIF 310.Rx filters from the access signal control bits for state machines 130.

The protection register 320 is equivalent to the protection register 170 of FIG. 1. In this example the protection register 320 comprises two portions, PROT.M to store the identification of the secure master CSM (110-cs), and PROT.Rx to store the control bits. The register 320 in this example is a single register, but may alternatively comprise a plurality of registers.

The state machine state 330 is equivalent to the state machine 130 of FIG. 1. As discussed above, the state machine 330 protects of a resource by controlling whether state transitions can only be done by a safe master, only by a secure master, or both. The state machine 330 may be implemented with flip-flops and comprises registers.

The state machine 330 is shown having two output signals—config_state signal and cs_config_state signal. The config_state signal is active and enables write gate 340 during the configuration state 230, the secure configuration state 260, and the initialization state 210. The cs_config_ state signal is cyber security specific and forces a secure state for resources with strong security requirements, such as the secure master CSM (110-*cs*) or a bus MPU; this signal prevents, for instance, via the inverter and the write enable gate 350, resource access during reconfiguration.

The access enable register 380 has, for example, 32 bits. Each bit represents one master, and thus an arbitrary combination of masters may be configured. The access enable register 380 can be inactivated during a secure check state 270. And when the state machine 330 allows the safe master M (110-0) to transition the resource 390 from the secure run state 250 to the secure configuration state 260, the safe master M (110-0) activates the access enable register 380 and notifies the secure master CSM (110-*cs*). The access enable register 380 write access can be restricted to a specific master by the TIF 370. Also, the access enable register 380 itself is a protection for a peripheral or a memory range.

The resource 390 is equivalent to the resource 120 of FIG. 1. The resource 390 may be, for example, a Random Access Memory (RAM). Access to the resource 390 can be restricted to a specific master or a set of masters by ACCEN 380 and TIF 360.

FIG. 4A illustrates bit fields 400A of the resource protection register 170 in accordance with aspects of the disclosure. FIG. 4B illustrates a table of bit field definitions 400B of the resource protection register 170 of FIG. 4A in accordance with aspects of the disclosure.

The upper portion of the bit fields 400A of the resource protection register 170 defines a master processor core 110 with the following bit fields: VM (three bits for a Virtual Machine (VM)), VME (one bit for enabling the VM), PRS (three bits for a PRotection Set), PRSE (one bit for Enabling the PRS), TAG_ID (six bits for the tag identification which identifies the master), MEN (one bit indicating that the Master setting is Enabled; if not set, then any master is enabled, such as during the initialization state 210), and M_P (one bit which has to be 1 when protection register 170 is written).

The lower portion of the bit fields 400A of the resource protection register 170 defines protection (R0_P, R1_P, R2_P, R3_P, R4_P) for the four resources 120 (R0, R1, R2, R3). There are four state control fields (x=0 . . . 3), with four bits for each state control. These state control fields permit different state machines 130 for different resources 120 which have a master in common. For each state control field (R0, R1, R2, R3), the state is identified with three bits. There are seven states: 0 (000, initialization state,) 1 (001, run state), 2 (010, configuration state), 4 (100, run lock state), 5 (101, secure run state), 6 (110, secure configuration state), and 7 (111 secure check state). The respective protection is identified with one protection bit (R0_P, R1_P, R2_P, R3_P), which is set to 0 for read and 1 for write in this example.

Table 4B in FIG. 4B comprises the fields, bits, types, and descriptions of the resource protection register 170 shown in FIG. 4A. For the sake of brevity, this information is not repeated here.

FIG. 5A illustrates a flowchart of a resource protection method 500B in accordance with aspects of the disclosure.

In Step 510A, a processor core of a plurality of processor cores 110 is assigned to be a secure master 110-*cs*, which is configured to run security software.

In Step 520A, another processor core of the plurality of processor cores 110 is assigned to be a safe master 110-0, which is configured to run safe software. This safe master 110-0 may be a safe master, which is configured to run safe software.

In Step 530A, a state machine 130 protects a resource 120, which is configured to be shared by the secure master 110-*cs* and the safe master 110-0, by allowing only the secure master 110-*cs* to transition the resource 120 to a particular state of the state machine 130, and allowing only the safe master 110-0 to transition the resource 120 to another particular state of the state machine 130.

FIG. 5B illustrates a flowchart of another resource protection method 500B in accordance with aspects of the disclosure.

In Step 510B, a virtual machine of a plurality of virtual machines 110-*cs*-*vm* of a master of a processor core of a plurality of processor cores 110 is assigned to be a secure virtual machine 110-*cs*-*vmcs*, which is configured to run security software.

In Step 520B, another virtual machine of the plurality of virtual machines 100-*cs*-*vm* is assigned to be a safe virtual machine 110-*cs*-*vm*0, which is configured to run safe software. This safe master 110-*cs*-*vm*0 may be a safe master, which is configured to run safe software.

In Step 530C, a state machine 130 protects a resource 120, which is configured to be shared by the secure virtual machine 110-*cs*-*vmcs* and the safe virtual machine 110-*cs*-*vm*0, by allowing only the secure virtual machine 110-*cs*-*vmcs* to transition the resource 120 to a particular state of the state machine 130, and allowing only the safe virtual machine 110-*cs*-*vm*0 to transition the resource 120 to another particular state of the state machine 130.

The techniques of this disclosure may also be described in the following examples.

Example 1. A System on Chip (SoC), comprising: a plurality of processor cores including a secure master, which is configured to run security software, and a non-secure master, which is configured to run non-security software; a resource configured to be shared by the secure master and the non-secure master; and a state machine configured to protect the resource by allowing only the secure master to transition the resource to a particular state of the state machine, and allowing only the non-secure master to transition the resource to another particular state of the state machine.

Example 2. The SoC of example 1, wherein the non-secure master is a safe master configured to execute safety software.

Example 3. The SoC of any combination of examples 1-2, wherein the secure master is configured to identify itself as the secure master to the resource as a part of a bus transaction.

Example 4. The SoC of any combination of examples 1-3, wherein the secure master or the non-secure master is identifiable by a master identification, which is part of the bus transaction and comparable to a configurable or hard-coded reference master identification stored at the resource.

Example 5. The SoC of any combination of examples 1-4, wherein the configurable reference master identification is write protected.

Example 6. The SoC of any combination of examples 1-5, wherein only the secure master or the non-secure master identifiable by the master identification matching the reference master identification is permitted to change the reference master identification to identify another one of the plurality of processor cores as the secure master or the non-secure master, respectively.

Example 7. The SoC of any combination of examples 1-6, wherein the secure master is configured to transmit its identification as the secure master to the resource protection register via a sideband signal as part of the bus transaction.

Example 8. The SoC of any combination of examples 1-7, wherein the resource is a register.

Example 9. The SoC of any combination of examples 1-8, further comprising: a plurality of resources; and a plurality of state machines, each of which corresponds with a respective one of the plurality of resources.

Example 10. The SoC of any combination of examples 1-9, wherein the state machine is configured to allow only the non-secure master to transition the resource from a run state to a configuration state, during which only the non-secure master is allowed to reconfigure the resource.

Example 11. The SoC of any combination of examples 1-10, wherein the reconfiguration comprises writing new configuration data to shadow registers, to prevent an impermissible configuration from becoming active before being checked by the secure master.

Example 12. The SoC of any combination of examples 1-11, wherein the state machine is configured to allow only the secure master to transition the resource from a configuration state to a check state, during which a configuration of the resource or of shadow registers of the resource cannot be changed and is checked.

Example 13. The SoC of any combination of examples 1-12, wherein the state machine is configured to allow only the secure master to transition the resource from the check state to a run state, during which the resource operates normally in a secure manner with the checked configuration.

Example 14. The SoC of any combination of examples 1-13, wherein the resource is a bus Memory Protection Unit (MPU) which is configured to control access to a memory.

Example 15. A System on Chip (SoC), comprising: a plurality of processor cores including a master comprising a plurality of virtual machines including a secure virtual machine, which is configured to run security software, and a non-secure virtual machine, which is configured to run non-security software; a resource configured to be shared by the secure virtual machine and the non-secure virtual machine; and a state machine configured to protect the resource by allowing only the secure virtual machine to transition the resource to a particular state of the state machine, and allowing only the non-secure virtual machine to transition the resource to another particular state of the state machine.

Example 16. The SoC of example 15, wherein the secure virtual machine is identifiable by a secure virtual machine identification, which is part of a bus transaction and comparable to a configurable or hard-coded reference identification stored at the resource.

Example 17. The SoC of any combination of examples 15-16, wherein the secure virtual machine is configured to identify itself as the secure virtual machine to the resource as a part of a bus transaction.

Example 18. A System on Chip (SoC), comprising: a plurality of processor cores including a secure master configured to run security software; and a state machine configured to protect a resource by allowing only the secure master to transition the resource to a particular state of the state machine.

Example 19. The SoC of example 18, wherein the secure master is a Hardware Security Module (HSM).

Example 20. A resource protection method, comprising: assigning a processor core of a plurality of processor cores to be a secure master, which is configured to run security software; assigning another processor core of the plurality of processor cores to be a non-secure master, which is configured to run non-security software; and a state machine protecting a resource, which is configured to be shared by the secure master and the non-secure master, by allowing only the secure master to transition the resource to a particular state of the state machine, and allowing only the non-secure master to transition the resource to another particular state of the state machine.

Example 21. The resource protection method of example 20, wherein the non-secure master is a safe master configured to execute safety software.

Example 22. The resource protection method of any combination of examples 20-21, further comprising: the secure master identifying itself as the secure master to the resource as a part of a bus transaction.

Example 23. The resource protection method of any combination of examples 20-22, wherein: the secure master or the non-secure master is identifiable by a master identification, which is part of the bus transaction, and the method further comprises comparing the master identification to a configurable or hard-coded reference master identification stored at the resource.

Example 24. The resource protection method of any combination of examples 20-23, further comprising: write protecting the configurable reference master identification.

Example 25. The resource protection method of any combination of examples 20-24, further comprising: permitting only the secure master or the non-secure master identifiable by the master identification matching the reference master identification, to change the reference master identification to identify another one of the plurality of processor cores as the secure master or the non-secure master, respectively.

Example 26. The resource protection method of any combination of examples 20-26, further comprising: the secure master transmitting its identification as the secure master to the resource protection register via a sideband signal as part of the bus transaction.

Example 27. The resource protection method of any combination of examples 20-26, wherein the resource is a register.

Example 28. The resource protection method of any combination of examples 20-27, further comprising: a plurality of state machines protecting a plurality of respective resources.

Example 29. The resource protection method of any combination of examples 20-28, further comprising: the state machine allowing only the non-secure master to transition the resource from a run state to a configuration state, during which only the non-secure master is allowed to reconfigure the resource.

Example 30. The resource protection method of any combination of examples 20-29, wherein the reconfiguration comprises: writing new configuration data to shadow registers, to prevent an impermissible configuration from becoming active before being checked by the secure master.

Example 31. The resource protection method of any combination of examples 20-30, further comprising: the state machine allowing only the secure master to transition the resource from a configuration state to a check state, during which a configuration of the resource or of shadow registers of the resource cannot be changed and is checked.

Example 32. The resource protection method of any combination of examples 20-31, further comprising: the state machine allowing only the secure master to transition the resource from the check state to a run state, during which the resource operates normally in a secure manner with the checked configuration.

Example 33. The resource protection method of any combination of examples 20-32, further comprising: controlling access to a memory by a bus Memory Protection Unit (MPU), which is the resource.

Example 34. A resource protection method, comprising: assigning a virtual machine of a plurality of virtual machines of a master of a processor core of a plurality of processor cores, to be a secure virtual machine, which is configured to run security software; assigning another virtual machine of the plurality of virtual machines to be a non-secure virtual machine, which is configured to run non-security software; and a state machine protecting a resource, which is configured to be shared by the secure virtual machine and the non-secure virtual machine, by allowing only the secure virtual machine to transition the resource to a particular state of the state machine, and allowing only the non-secure virtual machine to transition the resource to another particular state of the state machine.

Example 35. The resource protection method of example 34, wherein: the secure virtual machine is identifiable by a secure virtual machine identification, which is part of a bus transaction, and the method further comprises comparing the secure virtual machine identification to a configurable or hard-coded reference identification stored at the resource.

Example 36. The resource protection method of any combination of examples 34-35, wherein the secure virtual machine is configured to identify itself as the secure virtual machine to the resource as a part of a bus transaction.

Example 37. A resource protection method, comprising: assigning a processor core of a plurality of processor cores as a secure master configured to run security software; and a state machine protecting a resource by allowing only the secure master to transition the resource to a particular state of the state machine.

Example 38. The resource protection method of example 37, wherein the secure master is a Hardware Security Module (HSM). While the foregoing has been described in conjunction with exemplary embodiment, it is understood that the term "exemplary" is merely meant as an example, rather than the best or optimal. Accordingly, the disclosure is intended to cover alternatives, modifications and equivalents, which may be included within the scope of the disclosure.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This disclosure is intended to cover any adaptations or variations of the specific embodiments discussed herein.

What is claimed is:

1. A System on Chip (SoC), comprising:
a plurality of processor cores including a secure master, which is configured to run security software, and a non-secure master, which is configured to run non-security software;
a resource configured to be shared by the secure master and the non-secure master; and
a state machine configured to protect the resource by allowing only the secure master to transition the resource to a particular state of the state machine, and allowing only the non-secure master to transition the resource to another particular state of the state machine.

2. The SoC of claim 1, wherein the non-secure master is a safe master configured to execute safety software.

3. The SoC of claim 1, wherein the secure master is configured to identify itself as the secure master to the resource as a part of a bus transaction.

4. The SoC of claim 1, wherein the secure master or the non-secure master is identifiable by a master identification, which is part of transaction and comparable to a configurable or hard-coded reference master identification stored at the resource.

5. The SoC of claim 4, wherein the configurable reference master identification is write protected.

6. The SoC of claim 5, wherein only the secure master or the non-secure master identifiable by the master identification matching the reference master identification is permitted to change the reference master identification to identify another one of the plurality of processor cores as the secure master or the non-secure master, respectively.

7. The SoC of claim 3, wherein the secure master is configured to transmit its identification as the secure master to a resource protection register via a sideband signal as part of the bus transaction.

8. The SoC of claim 1, wherein the resource is a register.

9. The SoC of claim 1, further comprising:
a plurality of resources; and
a plurality of state machines, each of which corresponds with a respective one of the plurality of resources.

10. The SoC of claim 1, wherein the state machine is configured to allow only the non-secure master to transition the resource from a run state to a configuration state, during which only the non-secure master is allowed to reconfigure the resource.

11. The SoC of claim 10, wherein the reconfiguration comprises writing new configuration data to shadow registers, to prevent an impermissible configuration from becoming active before being checked by the secure master.

12. The SoC of claim 1, wherein the state machine is configured to allow only the secure master to transition the resource from a configuration state to a check state, during which a configuration of the resource or of shadow registers of the resource cannot be changed and is checked.

13. The SoC of claim 12, wherein the state machine is configured to allow only the secure master to transition the resource from the check state to a run state, during which the resource operates normally in a secure manner with the checked configuration.

14. The SoC of claim 1, wherein the resource is a bus Memory Protection Unit (MPU) which is configured to control access to a memory.

* * * * *